April 15, 1969     T. J. MOHRHUSEN     3,438,682
COMBINATION GRAVITY AND PNEUMATIC DISCHARGE SYSTEM FOR HOPPERS
Filed Oct. 17, 1967     Sheet 1 of 3
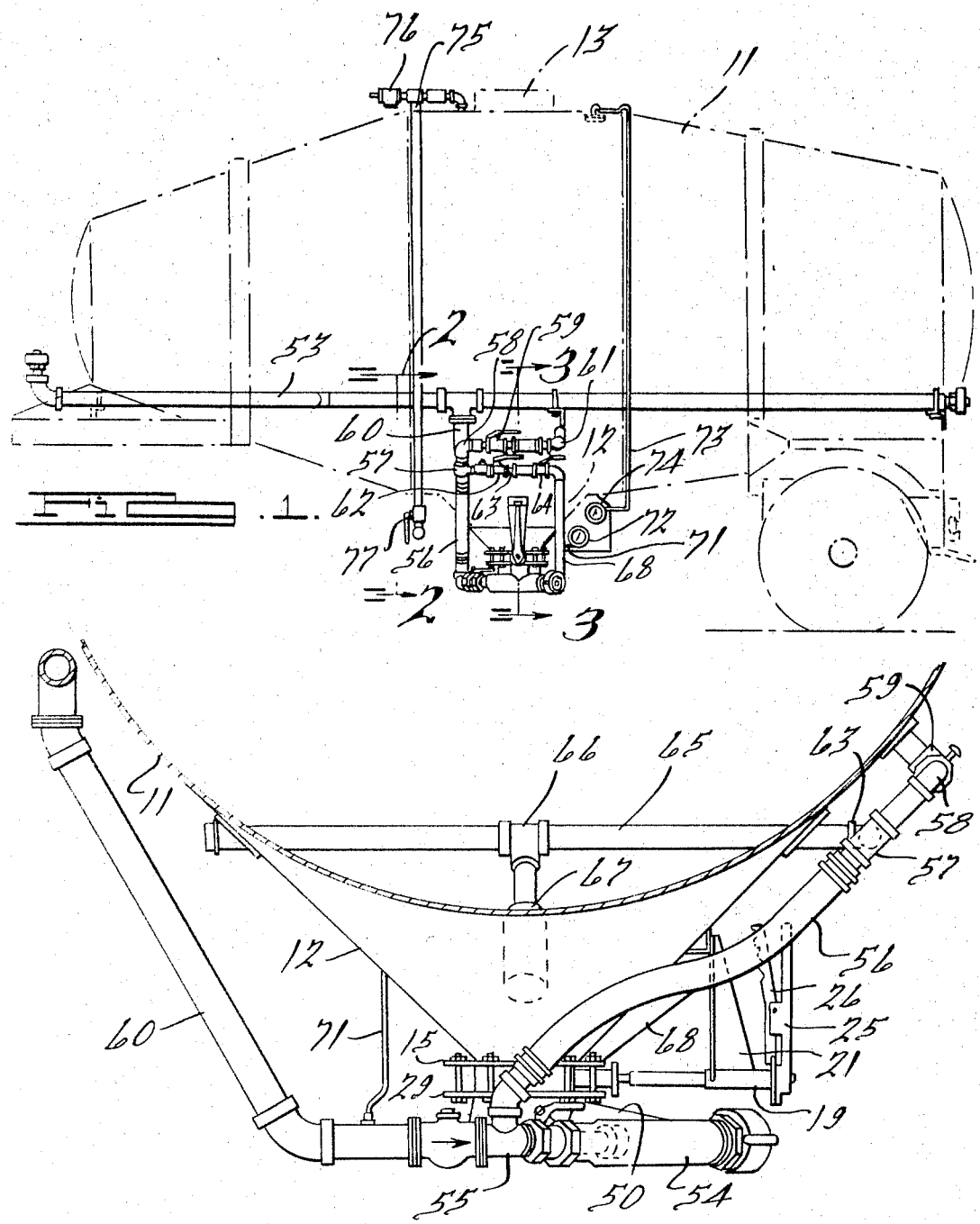
INVENTOR.
Theodore J. Mohrhusen
BY
Harness, Dickey & Pierce
ATTORNEYS

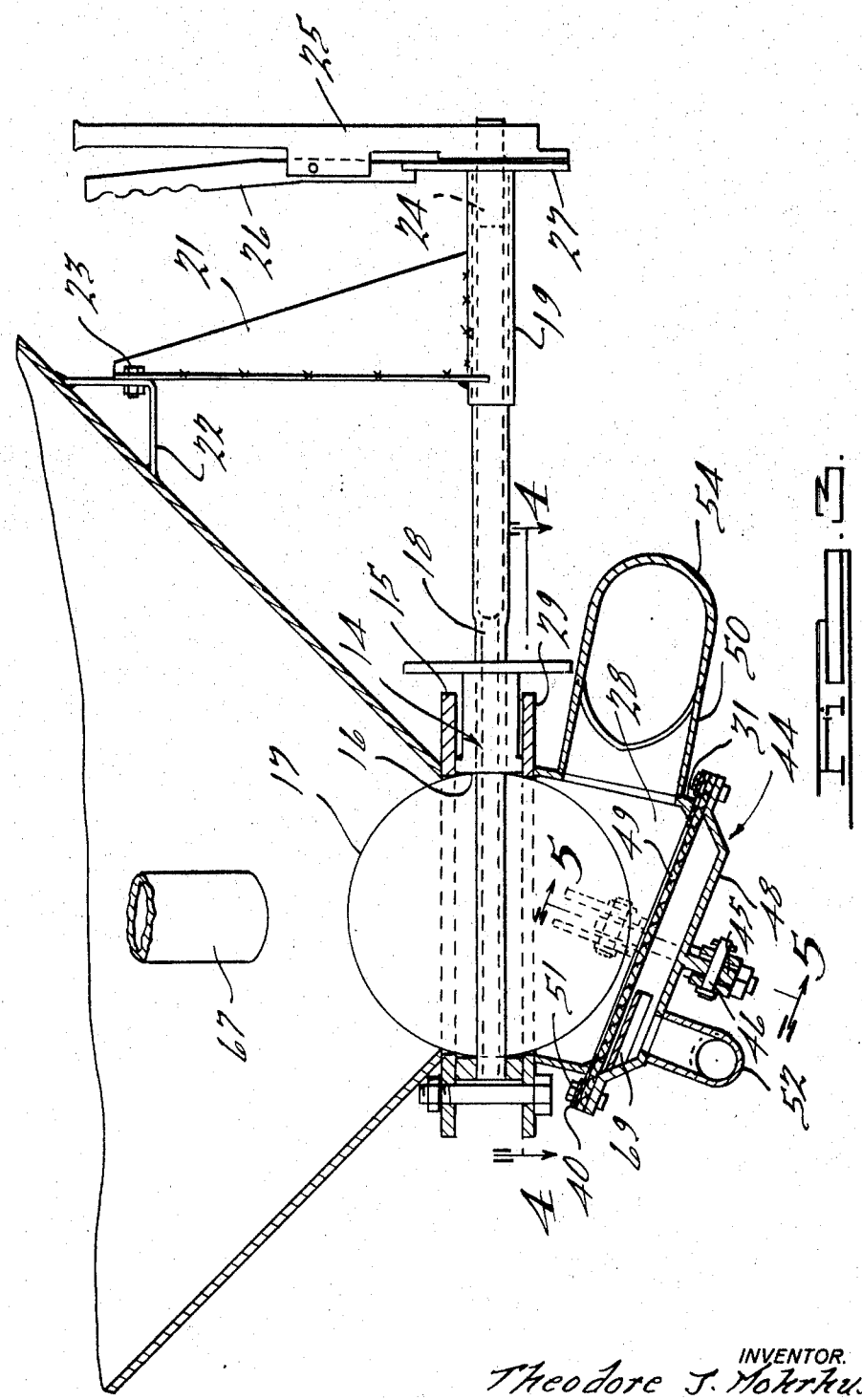

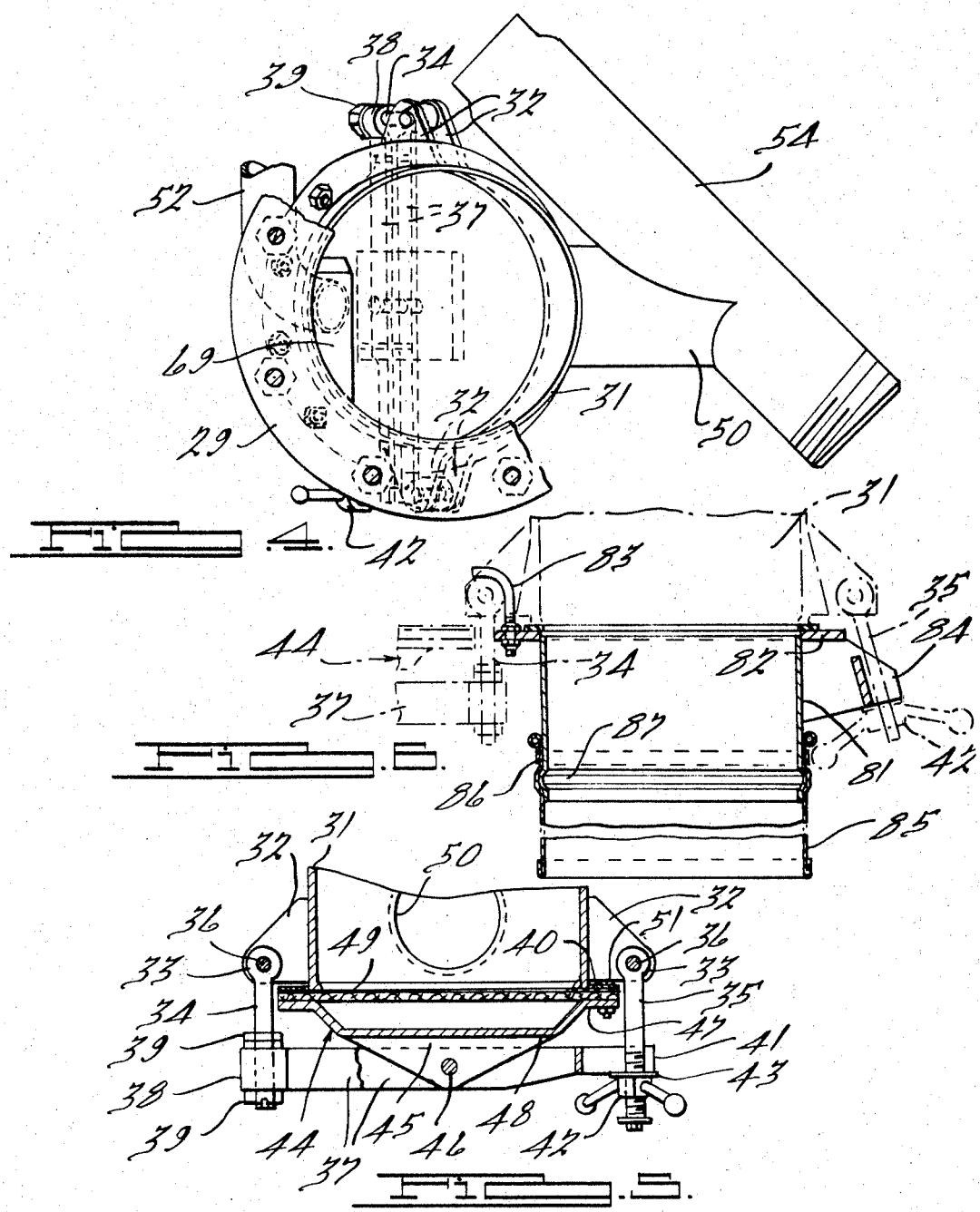

United States Patent Office 3,438,682
Patented Apr. 15, 1969

3,438,682
COMBINATION GRAVITY AND PNEUMATIC DISCHARGE SYSTEM FOR HOPPERS
Theodore J. Mohrhusen, Fresno, Calif., assignor to Fruehauf Corporation, Detroit, Mich., a corporation of Michigan
Filed Oct. 17, 1967, Ser. No. 677,502
Int. Cl. B65g 53/40, 53/58
U.S. Cl. 302—52         8 Claims

ABSTRACT OF THE DISCLOSURE

A hopper at the bottom of a sealable compartment having a cylindrical collar and butterfly valve at the bottom, has a discharge unit secured thereto by which the contents of the compartment is expressed from the discharge unit under air pressure. A conduit system pressurizes the compartment, the hopper and the discharge unit so that the powder or granules are aerated to permit a greater flow rate as it is advanced through a discharge conduit.

Background of the invention

In a comprehensive search of the prior art, the patent to Kaney, No. 2,780,369 of Feb. 5, 1967, was the closest art which was uncovered. The present structure and method is believed to be a substantial improvement over the teaching of this patent.

Summary of the invention

A tank of a car or trailer is herein illustrated as the closed container for the organic or inorganic powder or granules which is to be transported and quickly discharged by gravity or when entrained with a flow of air. A central hopper at the bottom of the tank has a butterfly valve by which the contents is discharged. A receiving chamber with a hinged cover and a quick-release securing clamp is attached to the hopper below the butterfly valve. The cover is a plenum chamber having an aerating closure over a compartment through which the air is blown into the receiving chamber and into a conduit for moving the aerated particles and carrying them to a point of delivery. Air is also directed into the tank and to a pair of nozzles in the hopper to aerate the particles and move them into the receiving chamber where they are further aerated and moved into the transporting conduit. The receiving chamber with the aerating cover is attachable to the bottom of the hopper and can readily be applied thereto to charge the tank fraom having a gravity discharge to one also having a discharge under a pressure of air in such a manner that the particles are aerated and readily blown from the hopper into and through a conduit to the point of delivery.

Brief description of the drawings

FIGURE 1 is a view of the device of the present invention shown attached to a tank for a car, trailer or the like, shown in dot and dash line;

FIG. 2 is an enlarged sectional view of a structure illustrated in FIG. 1, taken on the line 2—2 thereof;

FIG. 3 is an enlarged sectional view of the structure illustrated in FIG. 1, taken on the line 3—3 thereof;

FIG. 4 is a broken sectional view of the structure illustrated in FIG. 3, taken on the line 4—4 thereof;

FIG. 5 is a sectional view of the structure illustrated in FIG. 3, taken on the line 5—5 thereof, and FIG. 6 is a view of the structure illustrated in FIG. 5, showing a further form of the inventon.

Description of the preferred embodiment

A tank 11 of a tank car, to which the structure of the invention is applied, has a hopper 12 at the bottom and a sealable cover 13 for a fill opening at the top. When the cover is sealed the tank can be pressurized. A casting 14 is provided at the bottom of the hopper having a flange 15 and a cylindrical aperture 16 through which the contents of the tank is discharged. A butterfly valve 17 closes the aperture 16 and retains the material within the tank. The valve is mounted on a hollow shaft 18 which is supported in a sleeve 19 on a hanger 21 which is secured to a bracket 22 on the tank car by bolts 23. A stud 24 on the outer end of the shaft 18 is secured to a lever 25 which has a locking handle 26 pivoted thereto, the ends of which extends into a notch in a disc 27 secured to the end of the sleeve 19. The locking handle secures the butterfly valve 17 in open or closed position, or in positions therebetween.

The present invention adds a receiving chamber 28 to the casting 14, the chamber 28 embodying a flange 29 and a cylindrical extension 31 which projects downward at an angle to the flange to provide a slope thereto. The extension 31 has diametrically disposed pairs of spaced wings 32 between which an eye 33 of eyebolts 34 and 35 are secured by pivot pins 36. A crossbar 37 has a sleeve 38 on one end which is secured to the eyebolt 34 by nuts 39. The opposite end of the crossbar has a pair of spaced fingers 41 which receives the body of the eyebolt 35 and is secured thereon by a ball handled nut 42 and washer 43. This provides a quick release clamp for the crossbar 37.

A cover 44 forming a plenum chamber has a wing 45 which is received in a slot in the center of the crossbar 37 and is secured thereto by a pin 46. The cover has a flange 47 in a dish-shaped central portion 48 from which the wing 45 extends. The dish-shaped central portion forms an air chamber with a pervious disc 49 secured to the flange 47 by bolts 51 which extend through a retainer ring 40. The disc 49 is made from fabric with the edge portions sealed by a suitable coating material applied to both sides thereof. The dished central portion 48 has an elbow 52 secured over an aperture through the wall by which air is directed into the cover 44 to pass within the chamber 28 to assist in the flow of particles therefrom. The long side of the extension 31 has a pipe 50 secured thereto and joined to a pipe 54 of an air conduit system to which air is supplied for carrying the particles to a discharge station.

An intake pipe 53 is supported along the side of the tank 11 from either end of which air pressure may be supplied thereto. A pipe section 60 extends downwardly from the pipe 53 and is connected to a tee 55 from which the air passes through a flexible conduit 56 to a T 57 and through a coupling to the pipe 54. The through end of the T 57 is joined to an elbow 58 connected to a manual operated valve 59 which is connected by an elbow 61 to an aperture in the tank 11 to supply air thereto. The right-angle branch of the T 57 is connected to a valve 62, a T 63 and a valve 64. The right-angle branch of the T 63 is connected to a pipe 65 that passes through the walls of the hopper 12, as illustrated in FIG. 2. A T 66 in the center of the pipe 65 has two 90° outlets to which a pair of nozzles 67 are connected for directing air downwardly at a 45° angle each side of a vertical plane through the pipe 65. The valve 64 is connected by a flexible conduit 68 to the end of the elbow 52 of the hinge cover 44.

A baffle plate 69 is supported within the dished central portion 48 of the cover above the inlet aperture from the elbow 52 to diffuse the entering air and prevent it from directly impinging upon the previous disc 49. A small copper tube 71 leads from the intake pipe 60 to a pressure gauge 72 while a similar conduit 73 communicating with the top interior of the tank 11 is connected to a pressure gauge 74. The tank has a conduit 75 extending from the top with a valve 76 on the bottom end by which the air can be purged from within the tank. The conduit 75 has a relief valve 77 therein which limits the pressure buildup within the tank.

Air introduced into the tank 11 through the elbow 61 will loosen material therein so that it can flow to the hopper area where it will be further aerated by the pair of nozzles 67 and moved to the pervious disc 49, the air through which from the elbow 52 will aid in moving the powder or particles into the pipe 50 where it will be picked up in the pipe 54 by the air flowing therethrough and delivered through a length of conduit to its destination. The valves control the flow of air, the pressure of which is recorded on the gauges 72 and 74. The hinge cover 44 swings away from the tubular extension 31 leaving the opening clear so that the interior of the tank can be inspected and cleaned.

When the cover is moved from the opening at the bottom of extension 31, a cylindrical extension 81 may be secured thereon and sealed thereto by a washer and flange 82 at its upper end. A hook 83 on one side of the washer engages the eye 33 of the eyebolt 34 while the eyebolt 35 engages a pair of spaced fingers 84 located diametrically opposite to the hook 83 secured by the nut 42. A flexible conduit 85 is supported on the element 71 by a band 86 above an outwardly extending rib 87 at the bottom of the extension. The conduit prevents the escape of the powder or particles and directs them to the discharge point by gravity when the particles readily flow from the hopper. The device of the present invention permits the discharge of materials by gravity through a flexible tube or by a flow of air through a conduit.

What is claimed is:
1. In a discharge unit for the discharge opening of a hopper of a sealed compartment, an element forming an outlet chamber having an outlet conduit extending therefrom, means securing said element in extension of said discharge opening for extending said discharge opening, a member forming a plenum chamber, hinge means at one side of said member securing said member to the outlet end of said element to close and open said outlet end thereof independent of said outlet conduit, quick release clamp means at the opposite side of said member from said hinge means retaining said member in sealed relation to said element below said conduit which is in communication with the outlet chamber, a pervious air pad closing the plenum chamber across the end of said member facing said element, and means for conducting air to said plenum chamber from which it passes through said pad to aerate the material thereon so that it can pass into the outlet conduit and move from said hopper.

2. In a discharge unit as recited in claim 1, wherein said hinge means is an eyebolt pivoted to said element and fixed to said member, and said clamp is an eyebolt releasably engaging said member on the side thereof opposite to said hinge means.

3. In a discharge unit as recited in claim 2, wherein nozzle means in said hopper directs air toward said plenum chamber.

4. In a discharge unit as recited in claim 3, wherein said outlet conduit has an angularly disposed conduit at the end through which a flow of air is provided to move the air ladened material from said outlet conduit of the chamber.

5. In a discharge unit as recited in claim 4, wherein air is also supplied to the sealed compartment for agitating the material therein toward said hopper.

6. In a discharge unit as recited in claim 1, wherein a baffle plate is provided in the plenum chamber in the path of a flow of air thereto.

7. In a discharge unit as recited in claim 1, wherein a discharge tube is releasably secured to the discharge opening of the outlet chamber element by supporting means engaged by said eyebolts when the plenum chamber is in open position.

8. In a discharge unit as recited in claim 1, wherein a butterfly valve is provided between the hopper and the element for closing the discharge opening from the hopper, and means for moving said butterfly valve to open position and releasably securing it against its closing.

References Cited
UNITED STATES PATENTS

| | | | |
|---|---|---|---|
| 2,761,741 | 9/1956 | Shields | 302—53 |
| 2,804,349 | 8/1957 | Pynor | 302—29 |
| 3,105,721 | 10/1963 | Collins et al. | 214—83.28 |
| 3,260,389 | 7/1966 | Paton | 302—53 |
| 3,302,979 | 2/1967 | Rollins et al. | 302—52 |

ANDRES H. NIELSEN, *Primary Examiner.*